(12) United States Patent
Bush et al.

(10) Patent No.: US 10,277,066 B2
(45) Date of Patent: Apr. 30, 2019

(54) METHOD FOR BALANCING POWER IN PARALLELED CONVERTERS

(71) Applicant: Liebert Corporation, Columbus, OH (US)

(72) Inventors: Terry D. Bush, Westerville, OH (US); Brian P. Heber, Delaware, OH (US)

(73) Assignee: Vertiv Corporation, Columbus, OH (US)

( * ) Notice: Subject to any disclaimer, the term of this patent is extended or adjusted under 35 U.S.C. 154(b) by 459 days.

(21) Appl. No.: 15/060,964

(22) Filed: Mar. 4, 2016

(65) Prior Publication Data

US 2016/0308389 A1    Oct. 20, 2016

Related U.S. Application Data

(60) Provisional application No. 62/147,730, filed on Apr. 15, 2015.

(51) Int. Cl.
*H02J 3/46* (2006.01)
*H02J 9/06* (2006.01)
*H02M 7/493* (2007.01)

(52) U.S. Cl.
CPC .......... *H02J 9/061* (2013.01); *H02J 3/46* (2013.01); *H02J 9/062* (2013.01); *H02M 7/493* (2013.01)

(58) Field of Classification Search
None
See application file for complete search history.

(56) References Cited

U.S. PATENT DOCUMENTS

| 5,257,180 A | 10/1993 | Sashida et al. |
| 5,745,356 A * | 4/1998 | Tassitino, Jr. ............ H02J 3/46 |
| | | 307/32 |
| 5,757,634 A * | 5/1998 | Ferens .................. H02M 7/493 |
| | | 363/41 |

(Continued)

FOREIGN PATENT DOCUMENTS

| EP | 0524398 A2 | 1/1993 |
| GB | 2355350 A | 4/2001 |

OTHER PUBLICATIONS

International Search Report and Written Opinion regarding Application No. PCT/US2016/020949, dated May 23, 2016.

*Primary Examiner* — Thienvu V Tran
*Assistant Examiner* — David M Stables
(74) *Attorney, Agent, or Firm* — Harness, Dickey & Pierce, P.L.C.

(57) ABSTRACT

A method is provided for balancing power amongst parallel connected power converters in an uninterruptible power supply (UPS). The method includes: applying a control signal to each of the parallel connected power converters, where the control signals applied to the parallel connected power converters are derived from a common control signal output by a centralized controller; receiving measurements of current being supplied by each power converter to the load; and adjusting phase of voltage applied to at least one of the power converters based on the received current measurements, such that the phase adjustment causes same magnitude of current to flow though each filter. Advancing phase angle of the voltage increases current supplied by the at least one power converter while retarding phase angle of the voltage decreases current supplied by the at least one power converter.

17 Claims, 5 Drawing Sheets

(56) References Cited

U.S. PATENT DOCUMENTS

| | | | |
|---|---|---|---|
| 6,118,680 A | 9/2000 | Wallace et al. | |
| 6,191,500 B1* | 2/2001 | Toy | H02J 3/46 307/64 |
| 6,288,916 B1* | 9/2001 | Liu | H02J 3/38 307/66 |
| 6,346,798 B1 | 2/2002 | Passoni et al. | |
| 6,452,290 B1 | 9/2002 | Yoshioka et al. | |
| 6,803,679 B1* | 10/2004 | Luo | H02J 3/44 307/66 |
| 6,917,124 B2 | 7/2005 | Shetler, Jr. et al. | |
| 7,405,494 B2 | 7/2008 | Tassitino, Jr. et al. | |
| 7,541,793 B2 | 6/2009 | Saeueng et al. | |
| 7,667,351 B2 | 2/2010 | Marwali et al. | |
| 8,076,799 B2 | 12/2011 | Wu et al. | |
| 8,842,452 B2 | 9/2014 | Nielsen | |
| 2005/0043859 A1* | 2/2005 | Tsai | H02J 3/46 700/286 |
| 2006/0083039 A1 | 4/2006 | Oliveira et al. | |
| 2009/0009001 A1 | 1/2009 | Marwali et al. | |
| 2009/0009005 A1 | 1/2009 | Luo et al. | |
| 2012/0235480 A1* | 9/2012 | Kim | H02J 9/062 307/18 |
| 2014/0160814 A1 | 6/2014 | Morimoto et al. | |
| 2015/0001947 A1 | 1/2015 | Rozand et al. | |

\* cited by examiner

METHOD FOR BALANCING POWER IN PARALLELED CONVERTERS

CROSS-REFERENCE TO RELATED APPLICATIONS

This application claims the benefit of U.S. Provisional Application No. 62/147,730 filed on Apr. 15, 2015. The entire disclosure of the above application is incorporated herein by reference.

FIELD

The present disclosure relates to techniques for balancing power amongst parallel connected power converters in an uninterruptible power supply.

BACKGROUND

For mass production, a convenient design for an uninterruptible power supply (UPS) is to have identical "building block" that are used over and over again to get the desired power level. This is similar to a modular UPS construction where each building block is a functional UPS which are in turn parallel connected to get the desired power level. In a modular UPS design, the control system is distributed in each building block. It would be preferable to employ a centralized controller that controls each building block.

Each building block, however, requires slightly different control signals to account for differences in each building block. For example, each building block contains inductors and capacitors and these components having manufacturing tolerances ranging from ±5% to ±10%. From a centralized controller, if the same control signal is applied to each building block, the power through each building block will be different due to the mismatch in components (i.e., inductors and capacitors). In one approach, the inductors, capacitors and other building block power components can be oversized to account for any anticipated mismatch between components. Unfortunately, this approach adds cost. Therefore, there is a need for centralized control that balances power in each of the building blocks of a UPS.

This section provides background information related to the present disclosure which is not necessarily prior art.

SUMMARY

This section provides a general summary of the disclosure, and is not a comprehensive disclosure of its full scope or all of its features.

A method is provided for balancing power amongst parallel connected power converters in an uninterruptible power supply (UPS). The method includes: applying a control signal to each of the parallel connected power converters, where the control signals applied to the parallel connected power converters are derived from a common control signal output by a centralized controller; receiving measurements of current being supplied by each power converter to the load; and adjusting phase of voltage applied to at least one of the power converters based on the received current measurements, such that the phase adjustment causes same magnitude of current to flow though each filter. Advancing phase angle of the voltage increases current supplied by the at least one power converter while retarding phase angle of the voltage decreases current supplied by the at least one power converter. Adjustments in phase angle may be made by introducing a time delay to a control signal applied to the at least one power converter.

A relationship can be derived between a phase angle adjustment and a resulting change in magnitude of current flowing through a filter using a system power rating for the UPS and nominal design values for components comprising the filter.

In one aspect, the derived relationship is used to compute an initial phase angle adjustment needed to balance power amongst the power converters and subsequent adjustments in the phase of control signals are made using closed-loop feedback control.

In another aspect, any adjustments in the phase of control signals are made using only closed-loop feedback control.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
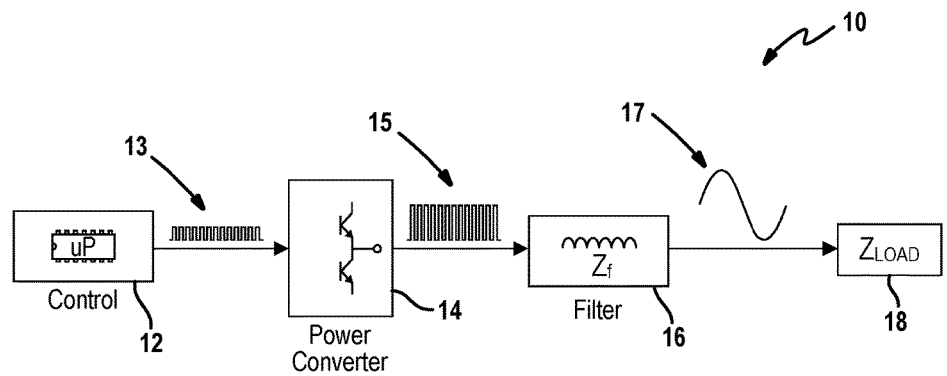
FIG. 1 is a diagram depicting a simplified uninterruptible power supply (UPS) module.

FIG. 1 depicts a simplified uninterruptible power supply (UPS) module 10. The UPS module 10 is comprised generally of a control block 12, a power converter 14, and a filter 16. The control block 12 generates pulse width modulated (PWM) signal 13. This is a relatively high frequency (e.g. several kHz) digital signal whose pulse width is varied at a 60 Hertz sinusoidal signal rate. This control signal 13 is applied to the power converter 14 which in turn generates a high voltage duplicate of the digital control signal. The power signal 15 is then filtered to remove the high frequency content of the signal and thereby recover the 60 Hz sinewave 17 which is applied to the load 18. It is noted that the UPS module 10 is designed to deliver a given maximum amount of power.

Figure 2:
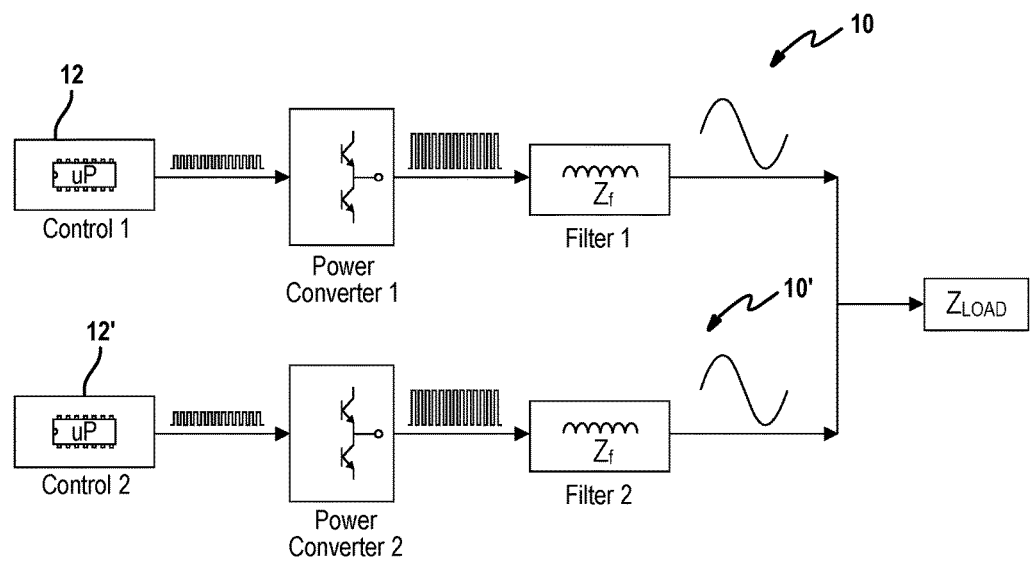
FIG. 2 is a diagram depicting two UPS modules connected in parallel.

Modules (i.e., building blocks) can be designed so that they can easily be connected in parallel for increased power capacity as seen in FIG. 2. One issue with this approach is that the modules do not necessarily share the total system power equally, which if not corrected will necessitate a de-rating of the system power available to the load. One cause of unequal sharing is the filter components. For example, the impedance of the filter inductors will not be matched due to tolerance errors inherent in the assembly process. In the conventional approach, each module 10, 10' has its own dedicated control block 12, 12'.

Figure 3:
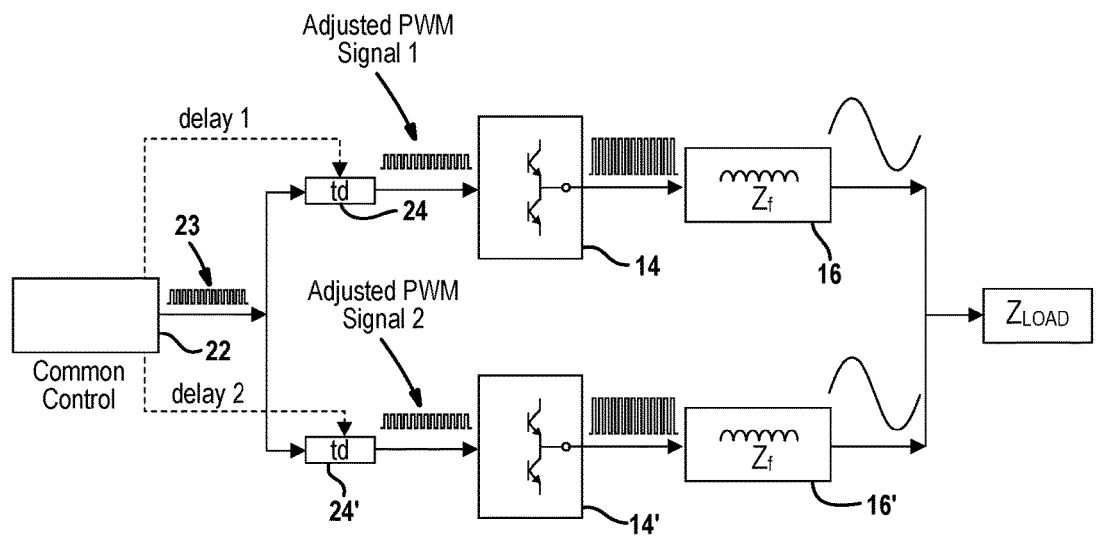
FIG. 3 is a diagram depicting two UPS modules connect in parallel with a common control block.

With reference to FIG. 3, a significant cost improvement can be realized by having only one common control block 22 for the entire UPS. In this case, only one common PWM signal 23 is created by the common control block 22. To implement power sharing between modules, a simply delay element 24 (e.g., a digital shift register) is inserted between the common control block 22 and each of the power converters 14, 14' as shown in FIG. 3. If an appropriate time delay is dynamically programmed into the shift registers by the common control block 22, it will have the effect of adjusting the relative phase angles of the individual modulating signals. This technique can be applied to any number of parallel modules to implement power sharing.

An analysis is presented which illustrates how adjusting the time delay of the individual PWM signals applied to the power converters in a multiple module parallel system will effectively control the current or power sharing between the converters. For simplicity, the analysis is conducted on a single phase equivalent of the three phase system. The principles derived below can be equally applied to a 3 phase system.

Figure 4:
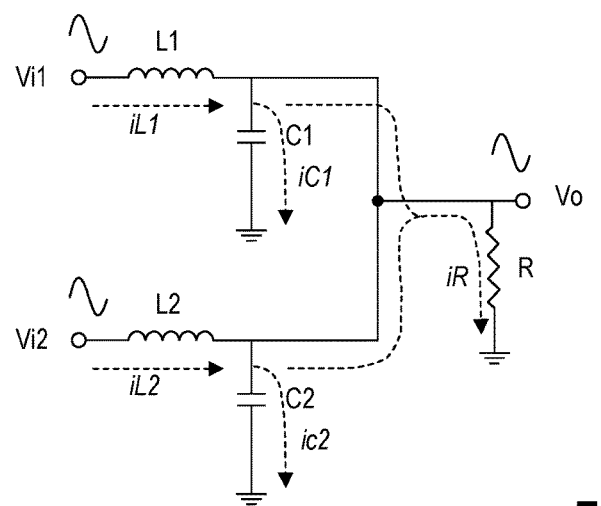
FIG. 4 is a schematic of two paralleled connected UPS modules.

FIG. 4 is a partial schematic of two paralleled connected UPS modules. Specifically, the circuit represents the output section of a dual module UPS. The circuit includes inductor (L1) and capacitor (C1) which form the output voltage filter of module 1, inductor (L2) and capacitor (C2) which form the output voltage filter of module 2, and resistor (R) which constitutes the UPS system load. The analysis will be done assuming 60 Hz voltages are applied to the circuit. This does not alter the results since the filters effectively remove the high frequency PWM carrier content of the power converter voltages applied (Vi1 and Vi2) and yields the modulating 60 Hz component of the voltage (Vo) which is applied to the load. The dashed lines in the diagram show the 60 Hz current paths which exist.

An initial step in the analysis is to determine the relationship which defines the output voltage applied to the load (Vo) as a function of the input voltages (Vi1 and Vi2) applied to the input of the filters. This will be done assuming that the filter components are of equal value (L1=L2 and C1=C2). Equations are formed to solve for Vo. From the diagram, the current in the load (iR) must equal the sum of the currents in the inductors (iL1 and iL2) minus the capacitor currents (iC1 and iC2):

$$iR = iL1 + iL2 - iC1 - iC2$$

Rearranging:

$$iL1 + iL2 = iR - iC1 - iC2$$

Expressing in complex number form:

$$\frac{Vi1 - Vo}{j\omega L} + \frac{Vi2 - Vo}{j\omega L} = \frac{Vo}{R} + Vo * j\omega C + Vo * j\omega C$$

Removing radicals:

$$R*(Vi1-Vo)+R*(Vi2-Vo)=Vo*j\omega L+2*Vo*j^2\omega^2 RCL$$

Solving for Vo:

$$Vo = \frac{(Vi1 + Vi2)*R}{2R + j\omega L - 2\omega^2 RCL}$$

Separating terms:

$$Vo = \frac{Vi1}{\frac{j\omega L}{R} - 2\omega^2 CL + 2} + \frac{Vi2}{\frac{j\omega L}{R} - 2\omega^2 CL + 2} \quad \text{(equation 1)}$$

To solve the equation for specific numerical values, values of the filter components must be given. For illustration purposes, assume a 400 KVA (or 800 KVA total for dual module) and 277 volts (phase to neutral voltage). Using the base impedance for this module rating $Z_{base}=V^2/VA$), a typical value for the inductor is 5% of the base impedance and 15% for the capacitor. This gives nominal values of 70 uH for the inductor and 600 uF for the capacitor. At 800 KVA, the load resistance is 0.288Ω. Substituting these component values for L, C, and R into equation 1:

$$Vo = \frac{277}{\frac{j2\pi*60*70e^{-6}}{.288} - 2*(2\pi*60)^2*600e^{-6}*70e^{-6}+2} +$$

$$\frac{277}{\frac{j2\pi*60*70e^{-6}}{.288} - 2*(2\pi*60)^2*600e^{-6}*70e^{-6}+2}$$

$$Vo = \frac{277\angle 0°}{1.9902\angle 2.64°} + \frac{277\angle 0°}{1.9902\angle 2.64°} = 278.4\angle -2.64° \text{ volts}$$

This result shows that the output voltage is very close to the input voltage (within ½% or less than 2 volts). At 277 volts across the load resistance of 0.288Ω, there is 962 amps flowing into the load. Since this current must come from the power converters and flow through the inductors, there must be enough voltage or "driving force" across each inductor to result in ½ of the total current or 481 amps. Forming the equation for current through the inductor:

$$iL1 = \frac{(Vi1 - Vo)}{j\omega * L} \quad \text{(equation 2)}$$

and $$iL2 = \frac{(Vi2 - Vo)}{j\omega * L}$$

The inductor impedance is given by ωL or $2\pi*60*70e^{-6}$. Given an inductor current of 481 amps and solving for the voltage difference (Vi−Vo) across the inductor calculates to approximately 12.7 volts. However, since the analysis shows that the amplitude of the difference between Vi and Vo (the voltage across the inductor) is less than 2 volts, the necessary voltage difference must result from the phase difference between the voltages rather than the amplitude. Checking this, the voltage is calculated by 277∠0°−278.4∠−2.64° or approximately 277*sin (2.64°) which equals the 12.7 volts necessary to drive 481 amps through each inductor.

The above analysis shows that if both power converter voltages are equal (or approximately equal) in amplitude, then the driving force for the inductor current is largely controlled by the phase of the filter input voltage compared to the output voltage. This implies that if both converter voltages are in phase and the currents (or power) through the inductors do not share equally, perhaps due to tolerance errors in the inductor values or other reasons, then the power could be made to share by independently adjusting the phase of the voltages applied to the inductors. Furthermore, since the voltage applied to the inductors comes from the power converter, which in turn receive their voltage generating signals from modulated PWM voltage control signals, a current sharing adjustment could be accomplished by inserting independent phase adjustment elements between a common PWM voltage control signal and the individual power converters. Since a phase adjustment of the 60 Hz voltage is in essence a time delay relative to a reference voltage, adding a simple time delay to the PWM voltage control signal would be equivalent to adjusting the phase of the voltage.

To illustrate this, an example is presented with the inductor in the second module's filter at 10% less (63 uH) than the nominal design value. Calculating the voltage at Vo (equation 1) with the mismatched inductors:

$$Vo = \frac{277}{\frac{j2\pi*60*70e^{-6}}{.288} - 2*(2\pi*60)^2*600e^{-6}*70e^{-6} + 2} +$$

$$\frac{277}{\frac{j2\pi*60*63e^{-6}}{.288} - 2*(2\pi*60)^2*600e^{-6}*63e^{-6} + 2}$$

$$Vo = \frac{277\angle 0°}{1.9902\angle 2.64°} + \frac{277\angle 0°}{1.9909\angle 2.37°} =$$

$$139.2\angle -2.64° \text{ volts} + 139.1\angle -2.37° = 278.3\angle -2.505°$$

Since the same voltage is applied to both inductors from the power converters, there are equal voltages across the inductors, but because the inductor impedances are unequal, the currents through the inductors (equation 2) are not balanced:

$$iL1 = \frac{(277\angle 0° - 278.3\angle -2.5°)}{j\omega*70e^{-6}} = \frac{12.2 \text{ volts}}{.02639} = 462 \text{ amps}$$

$$iL2 = \frac{(277\angle 0° - 278.3\angle -2.5°)}{j\omega*63e^{-6}} = \frac{12.2 \text{ volts}}{.02375} = 514 \text{ amps}$$

This is a mismatch of +/- 5% with module #2 running at 105% overrated condition. To correct this condition, the voltage signal to power converter #2 will be delayed in order to change the phase angle of the voltage applied to the inductor.

The above analysis showed that a phase angle difference across the inductor of 2.64° was needed to force 481 amps of current to flow. This equates to approximately 0.0055° per amp which, at 60 Hz, is equivalent to 0.2315 micro-seconds per amp. Since there is a 52 amp difference between the inductor currents, the voltage control signal should be delayed 52*0.2315, or 12 usec. This is equivalent to a phase delay of 0.26°. Adjusting the phase of the applied voltage by this amount in equations 1 and 2:

$$Vo = \frac{277\angle 0°}{1.9902\angle 2.64°} + \frac{277\angle -.26°}{1.9909\angle 2.37°} =$$

$$139.2\angle -2.64° \text{ volts} + 139.1\angle -2.63° = 278.3\angle -2.635°$$

-continued $$iL1 = \frac{(277\angle 0° - 278.3\angle -2.635°)}{j\omega*70e^{-6}} = \frac{12.83 \text{ volts}}{.0264} = 486 \text{ amps}$$

$$iL2 = \frac{(277\angle 0.26° - 278.3\angle -2.635)°}{j\omega*63e^{-6}} = \frac{11.57 \text{ volts}}{.0238} = 486 \text{ amps}$$

This yields an ideal current sharing between the inductors. Since the voltages generated by the power converters are essential identical, the power (volts*current) is balanced between the modules. This illustrates that the module power sharing can be controlled by adjusting a time delay element inserted between a common control signal generator and each individual power converters. Furthermore, the relationship between the appropriate time delay and a given power imbalance is proportional to the current mismatch between the individual module currents being supplied to the load, and that given a system power rating and nominal design filter component values, the relationship can be expressly defined as a delay time (in usec) per module current difference (in amps).

Figure 5:
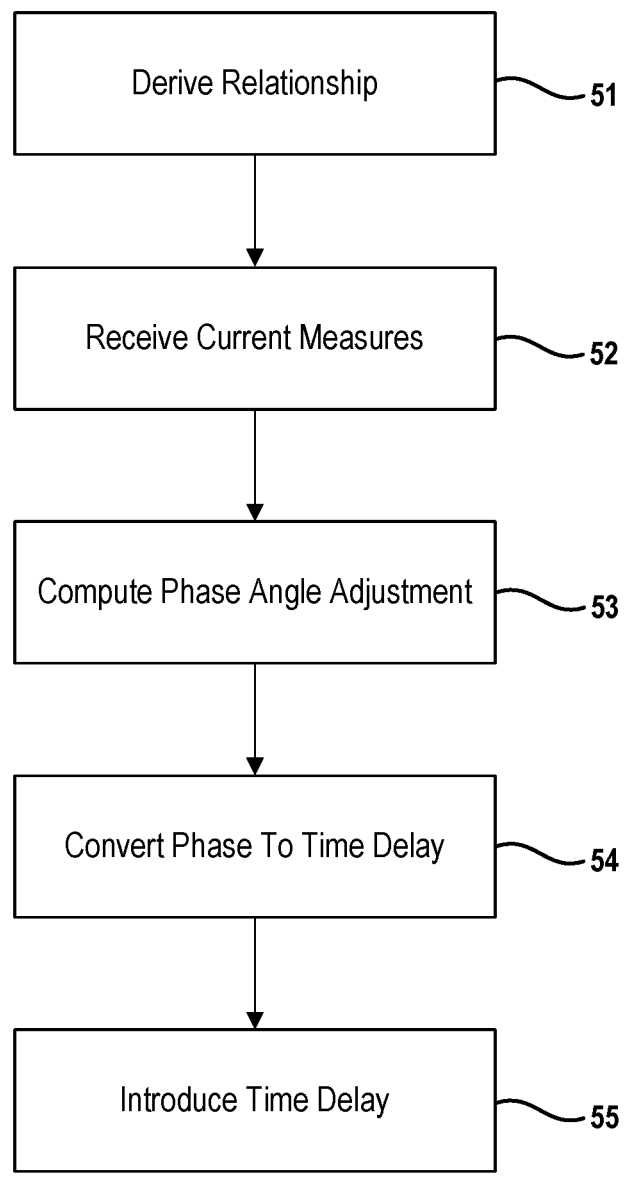
FIG. 5 is a flowchart depicting an example method for balancing power amongst parallel connected power converters.

In an example embodiment, the common control block implements this method for balancing power amongst parallel connected power converters in an uninterruptible power supply (UPS) as described in relation to FIG. 5. For a given UPS, the relationship between phase angle adjustment and the resulting change in magnitude of current flowing through a filter is derived at 51 as a starting point. This relationship between the phase angle adjustment and the resulting change in current is derived in the manner described above using a system power rating for the UPS and nominal design values for components comprising the filter. In some embodiments, the adjustment in phase angle is converted to a time delay and stored as a relationship between a time delay and the resulting change in magnitude of current flowing through a filter. In either case, the relationship is stored in a data store associated with the control block and used to balance power as further described below.

During operation, the control block is configured to receive measurements of current and/or voltage being supplied by the power converters to the load as indicated at 52. These measures are used to determine an imbalance in the power supplied by each of the parallel connected power converters. Since the same voltage is applied to the filter inductors from the power converters, the voltages across the inductors are equal. Thus, the imbalance can be determined solely from the difference in currents through the inductors. Alternatively, the power supplied by each power converter can be computed from voltage and current measurements.

From the difference in currents, the adjustment in phase angle needed to balance the power amongst the power converters is computed at 53. In general, advancing phase angle of the control signal applied to a power converter increases current supplied by the power converter while retreating (or decreasing) phase angle of the control signal applied to a power converter decreases current supplied by the power converter. Continuing with the example set forth above, there may be a 52 amp difference between the inductor currents (i.e., the current supplied by the power converters) and the derived relationship for the given UPS may be defined as 0.0055 degrees of phase angle adjustment yields one amp of current change. In this example, the adjustment in phase angle needed to balance the power is computed as 0.286 degrees (52 amps*0.0055 degrees per amp). At 60 Hertz, the adjustment in phase angle converts at 54 to a time delay of 12 microseconds. In some embodiments, the derived relationship may be represented as an amount of time delay which yields one amp of current change (e.g., 0.0055 degrees per amp equates to 0.2315 microseconds per amp). In such embodiments, the current difference can be translated directly to a time delay needed to balance the power amongst the power converters. In either case, the determined time delay is introduced at 55 to the control signal applied to the applicable power converter. It is to be understood that only the relevant steps of the methodology are discussed in relation to FIG. 5, but that other software-implemented instructions may be needed to control and manage the overall operation of the UPS.

In the example embodiment, a single adjustment in phase angle is made to each applicable control signal during steady state operation of the UPS. Following an initial adjustment, it is readily understood that further adjustments can be made to the introduced time delay, for example using closed-loop feedback control. For example, various control methods, such a P-I (proportional-integral) controller, could be applied to the system to allow precise control of the current sharing and account for any error in the derived delay time per amp current ratio. It should also be apparent that such control system could be employed to account for any current or power imbalance caused by other system component tolerances that may also affect power sharing between modules. This could include impedance differences between cables and bus bars used for conducting current, losses in the power converter switching devices, or any other component that affects power deliver to the load. In other embodiments, the phase angle of applicable control signals are adjusted only using closed-loop feedback control.

Figure 6:
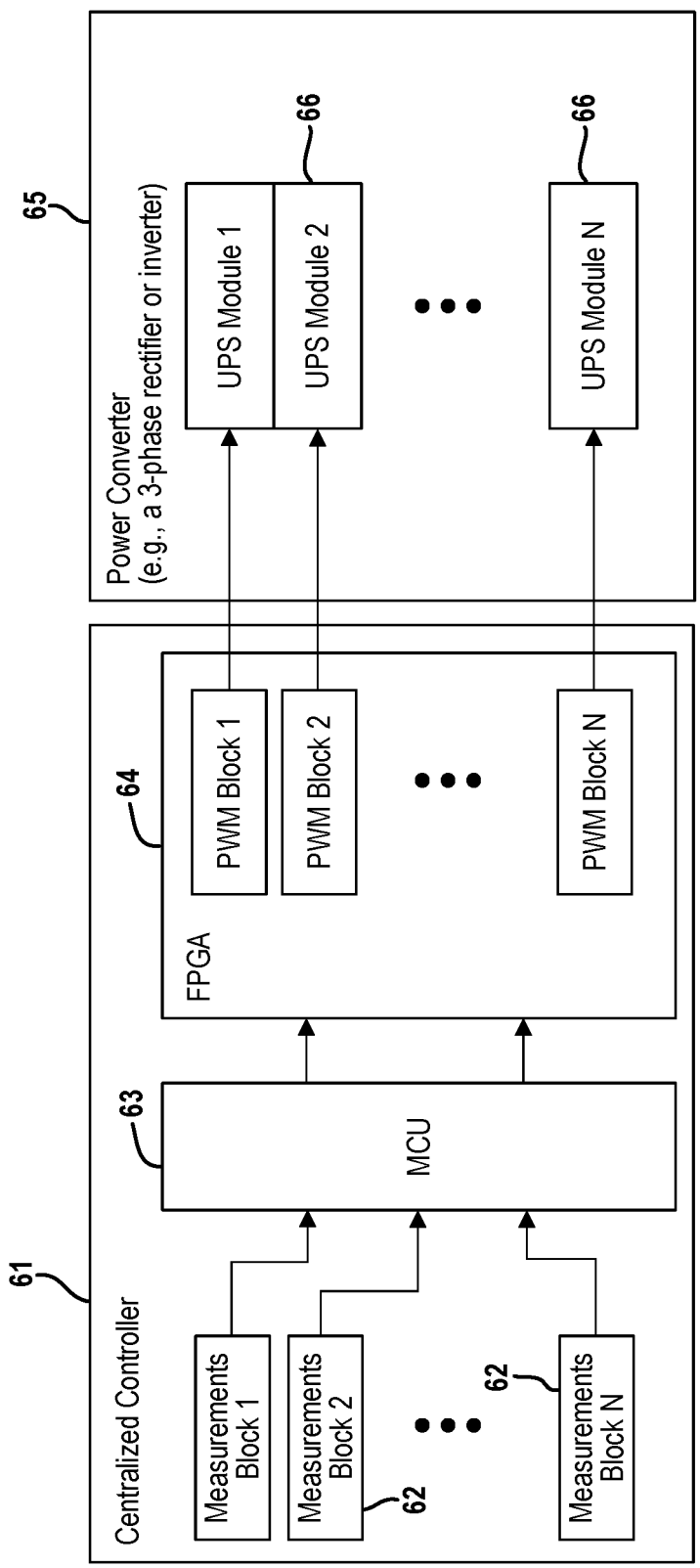
FIG. 6 is a block diagram of an example embodiment of a UPS.

An example implementation of this power sharing technique is described in relation to FIG. 6. In an example UPS 60, a centralized controller 61 may include a plurality of measurement blocks 62, a microcontroller 63, and a field programmable gate array (FPGA) 64. Each measurement block 62 corresponds to one of the UPS modules 66 (i.e., power converters) comprising the UPS and is configured to receive voltage and/or current measurements being supplied by the corresponding power converter 66. The microcontroller 63 generates a common 3-phase PWM signal which gets sent to the FPGA 64. The FPGA 64 splits the 3-phase PWM signal into multiple 3-phase PWM signals, one for each UPS module 66. The 3-phase PWM signal is then sent by the FPGA 64 to the applicable UPS module 66. The power converter 66 could be a rectifier or an inverter. As appreciated by those skilled in the art, current would flow from a source in the case of the rectifier.

Additionally, there is a communication link between the microcontroller 63 and the FPGA 64 which is used to send the delay value(s) to the FPGA 64. A delay can be applied equally to each of the three phases or it could be applied individually to each phase. The microcontroller 63 receives voltage and/or current measurements from each UPS module 66 and calculates the power in each UPS module 66. The microcontroller 63 executes a control loop for each UPS module 66 which outputs a delay value for each UPS module 66. The delay value(s) are in turn applied to applicable 3-phase PWM signals by the FPGA 64. By delaying PWM signal for one UPS module relative to another UPS module, the power through the UPS module will be less. This process repeats until the power in each UPS module is the same.

Figure 7:
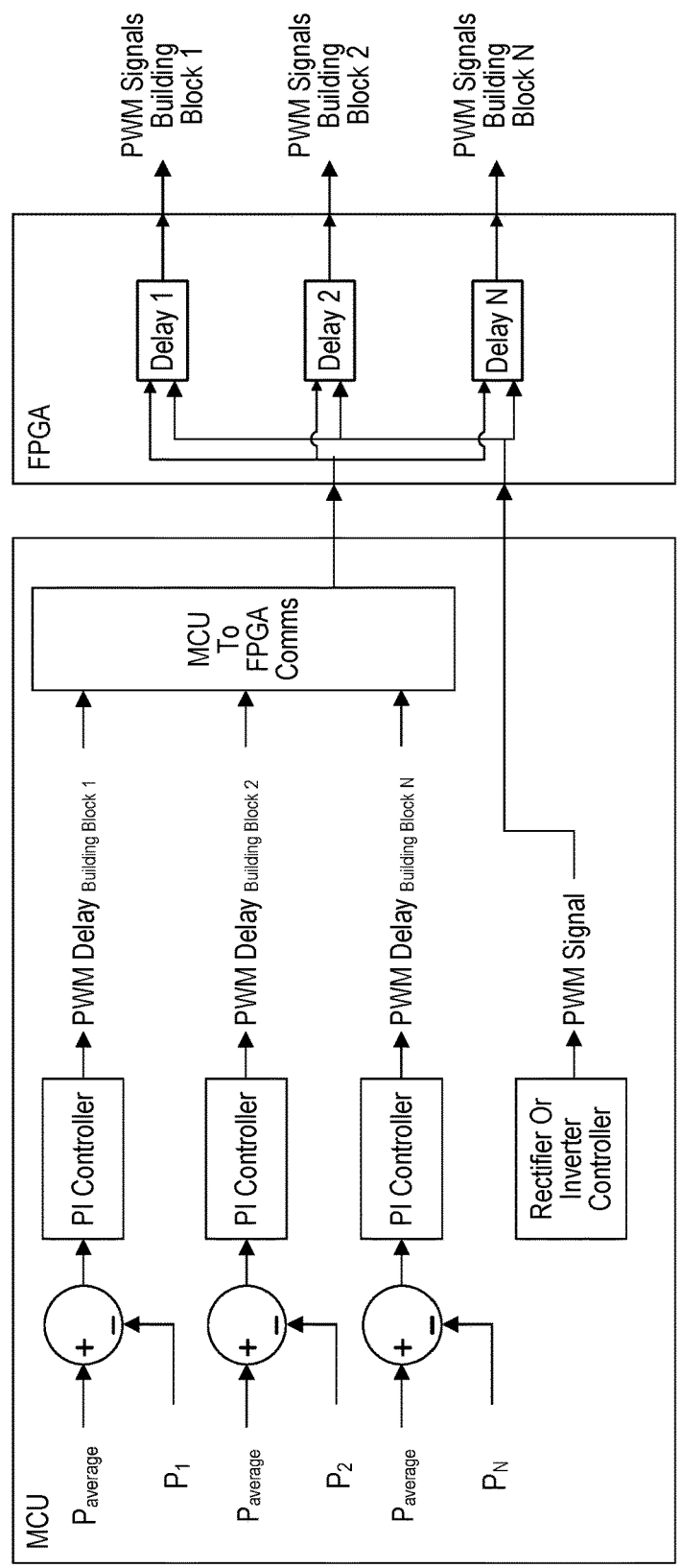
FIG. 7 is a block diagram depicting an example control loop which may be implemented by the microcontroller.

FIG. 7 further illustrates an example control loop which may be implemented by the microcontroller. The MCU measures the 3-Phase currents in each building block and one 3-Phase voltage common to each building block. The 3-Phase signals are converted to the DQ rotating reference.

$$\begin{bmatrix} V_q \\ V_d \\ V_o \end{bmatrix} = \frac{2}{3} \begin{bmatrix} \cos(\theta) & \cos(\theta - 2\pi/3) & \cos(\theta + 2\pi/3) \\ \sin(\theta) & \sin(\theta - 2\pi/3) & \sin(\theta + 2\pi/3) \\ \frac{1}{2} & \frac{1}{2} & \frac{1}{2} \end{bmatrix} * \begin{bmatrix} V_a \\ V_b \\ V_c \end{bmatrix},$$

$$\begin{bmatrix} I_q \\ I_d \\ I_o \end{bmatrix} = \frac{2}{3} \begin{bmatrix} \cos(\theta) & \cos(\theta - 2\pi/3) & \cos(\theta + 2\pi/3) \\ \sin(\theta) & \sin(\theta - 2\pi/3) & \sin(\theta + 2\pi/3) \\ \frac{1}{2} & \frac{1}{2} & \frac{1}{2} \end{bmatrix} * \begin{bmatrix} I_a \\ I_b \\ I_c \end{bmatrix},$$

where $\theta$ is the electrical angle calculated by the MCU

Next, the 3-Phase total power is calculated as given in Equation 2 below.

$P = V_d \cdot I_d + V_q \cdot I_q$, where $P$ is the real power.

$Q = V_d \cdot I_q - V_q \cdot I_d$, where $Q$ is the reactive power.  (2)

Knowing the real power in each building block, the MCU can calculate a delay to apply to each building block to balance the power. In this example, a simple proportional-integral controller (PI controller) is used to generate the PWM delay command. Total power is calculated as the sum of each building block and the average power is the total power divided by the number of building blocks. The error signal is calculated as given below in Equation 5.

$P_{total} = P_1 + P_2 + P_3 \ldots P_N$, where $N$ is the number of building blocks.  (3)

$P_{average} = P_{total}/N$  (4)

$E_1 = P_{average} - P_1$ $E_2 = P_{average} - P_2$ $E_N = P_{average} - P_N$  (5)

From the error signals, phase delay applied to one or more of the power converters is adjusted. For example, if power converter 1 has more power than the average and power converter 2 and 3 have less power than the average, then the controller will calculate a phase delay such that power converter 1 will reduce its power. Likewise, the controller will calculate a phase delay such that power converters 2 & 3 will increase their power. Different methods for determining which power converter to adjust and by how much are readily understood by those skilled in the art. In any case, the process is repeated until a steady state is reached. When steady state is reached, power from converter 1, converter 2 and converter 3 will equal the average. In this way, the power is balanced amongst the power converters.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method to balance power amongst parallel connected power converters in an uninterruptible power supply (UPS), each power converter having an output coupled via a filter to a load, comprising:

applying, by a centralized controller, a control signal to each of the parallel connected power converters, where the control signals applied to the parallel connected power converters are derived from a common control signal output by the centralized controller;

receiving, by the centralized controller, measurements of current being supplied by each power converter to the load;

receiving, by the centralized controller, a single measurement of voltage common to each power converter;

adjusting, by the centralized controller, phase of voltage applied to at least one of the power converters based on the received current measurements and the voltage measurement, such that the phase adjustment causes same magnitude of current to flow though each filter.

2. The method of claim 1 wherein adjusting phase of voltage further comprises advancing phase angle of the voltage to increase current supplied by the at least one power converter and retarding phase angle of the voltage to decrease current supplied by the at least one power converter.

3. The method of claim 1 further comprises adjusting phase of voltage by introducing a time delay to a control signal applied to the at least one power converter.

4. The method of claim 3 further comprises introducing a time delay using a shift register disposed between the centralized controller and the at least one power converter.

5. The method of claim 3 wherein adjusting phase of voltage further comprises deriving a relationship between phase angle and a change in magnitude of current flowing through a filter, where the relationship is derived using a system power rating for the UPS and nominal design values for components comprising the filter.

6. The method of claim 5 further comprises
determining differences between the measured currents being supplied by each power converter;
computing an adjustment quantity to phase angle of the voltage applied to the at least one power converter using the differences between the measured current and the relationship;
converting the adjustment quantity in phase angle to a time delay; and
introducing the time delay to the control signal applied to the at least one power converter.

7. The method of claim 5 further comprises
receiving a voltage measure common to each of the power converters;
calculating power for each of the power converters using the current measurements and the voltage measure;
calculating an average power across the power converters;
determining a difference between the average power and the power for a given power converter;
computing an adjustment quantity to phase angle of the voltage applied to the given power converter using the difference;
converting the adjustment quantity in phase angle to a time delay; and
introducing the time delay to the control signal applied to the given power converter.

8. The method of claim 1 wherein adjusting phase voltage applied to the at least one power converter further comprises initially adjusting phase of voltage according to the relationship and subsequently adjusting the phase of voltage using closed-loop feedback control.

9. The method of claim 1 further comprises adjusting phase of voltage applied to the at least one power converter using only closed-loop feedback control.

10. A method to balance power amongst parallel connected power converters in an uninterruptible power supply (UPS), each power converter having an output coupled via a filter to a load, comprising:
applying, by a centralized controller, a control signal to each of the parallel connected power converters, where the control signals applied to the parallel connected power converters are derived from a common control signal generated by the centralized controller;
receiving, by the centralized controller, measurements of current being supplied by each power converter to the load;
receiving, by the centralized controller, a measurement of voltage common to each power converter;
computing an adjustment quantity to phase angle of the voltage applied to the at least one power converter using the voltage measurement and the current measurements and a derived relationship between phase angle and a change in magnitude of current flowing through a filter;
converting the adjustment quantity in phase angle to a time delay; and
introducing the time delay to the control signal applied to the at least one power converter.

11. The method of claim 10 further comprises deriving the relationship between phase angle and a change in magnitude of current flowing through a filter using a system power rating for the UPS and nominal design values for components comprising the filter.

12. The method of claim 10 further comprises introducing a time delay using a shift register disposed between the centralized controller and the at least one power converter.

13. The method of claim 10 further comprises
calculating power for each of the power converters using the current measurements and the voltage measure;
calculating an average power across the power converters;
determining a difference between the average power and the power for the at least one power converter; and
computing the adjustment quantity to phase angle of the voltage applied to the at least one power converter using the difference.

14. A system for balancing power amongst parallel connected power converters in an uninterruptible power supply, comprising:
two or more power converter circuits coupled in parallel with each other, each power converter having an output coupled via a filter to a load;
a common controller configured to receive a measurement of current being supplied to the load by each of the power converters and operates to output a control signal to each of the power converters, where the control signals output by the common controller are a replica of a common control signal; and
a time delay element positioned at an input of each of the power converters and configured to receive one of the control signals output by the common controller, wherein the common controller determines a given time delay for at least one of the power converters based on the current measurements and interacts with at least one time delay element to introduce the given time delay to the respective control signal received by the at least one time delay element, such that current flow through filters of the two or more power converter circuits is same.

15. The system of claim 14 further comprises a data store accessible to the common controller and storing a relationship between phase angle and a change in magnitude of current flowing through a filter, wherein the common controller determines the given time delay using the stored relationship.

16. The system of claim 14 wherein the power converters are one of a rectifier or an inverter.

17. The system of claim 14 wherein the time delay element is further defined as a shift register.

* * * * *